UNITED STATES PATENT OFFICE

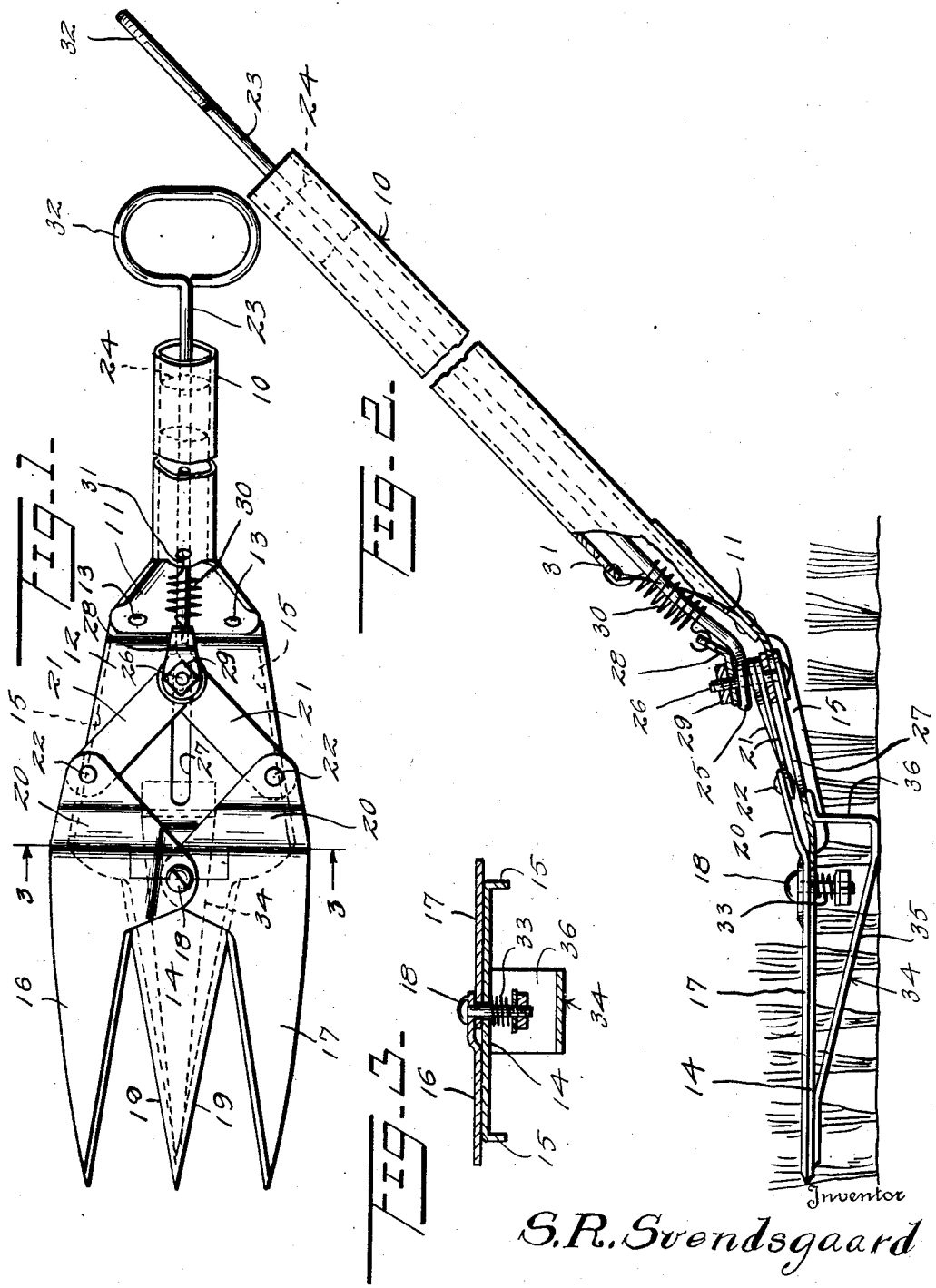

SVERRE R. SVENDSGAARD, OF MARSHFIELD, OREGON

GRASS SHEARS

Application filed February 24, 1932. Serial No. 594,861.

This invention relates to shears and more particularly to a shears adapted for use in the trimming of grass.

An object of this invention is to provide a novel trimming shears which is provided with an elongated handle so that the shears can be operated without the necessity of stooping over so as to trim the edges of a lawn at points where the grass is left uncut by the conventional mower.

Another object of this invention is to provide a trimming shears of this kind which is very simple in construction so that it can be manufactured at a small cost.

A further object of this invention is to provide a shears of this kind which is simple in construction so that it will not readily get out of order, and the shears is so constructed that it can be used with either a single or a double blade.

The above and various other objects and advantages of this invention will in part be described in and in part be understood from the following detailed description of the present preferred embodiment, the same being illustrated in the accompanying drawing, wherein:—

Figure 1 is a fragmentary detail top plan view of a device constructed according to the preferred embodiment of this invention;

Figure 2 is an enlarged detail side elevation partly broken away;

Figure 3 is a sectional view taken on the line 3—3 of Figure 1.

Referring to the drawing wherein like numerals of reference designate corresponding parts throughout the several views, the numeral 10 designates generally a handle which in the present instance is of hollow construction, being constructed from a tube, and this handle 10 is provided at the lower end thereof with a flattened flaring portion 11 which is secured to the upper or base portion 12 of a fixed cutting blade 14. The base portion 12 is secured to the lower end 11 of the handle 10 by means of rivets 13 or the like. This base 12 is constructed of relatively thin metal having downturned opposite edge portions 15 which provide flanges to reinforce the base and prevent bending thereof.

A pair of movable blades 16 and 17 are pivotally secured on a pivotal member 18 to the fixed blade 14 and these blades 16 and 17 have the inner edges thereof sharpened for engagement with the opposite edges 19 of the fixed blade 14. Preferably, this fixed blade 14 is constructed in tapering form with the opposite keen edges thereof converging outwardly. The movable blades 16 and 17 are enlarged as at 20, and a link 21 is connected by means of a pivot 22 to this enlarged or extending portion 20.

An operating member or rod 23 extends longitudinally through the handle 10, and this handle 10 is provided adjacent the upper end thereof with a bushing 24 providing a bearing for the rod 23. The opposite end of the rod 23 extends outwardly of the lower end of the handle 10 and is provided with a looped portion 25 engaging about a bolt 26, the bolt 26 being disposed through the inner end of the link 21. There are two links 21 provided, these links being each connected to the movable blades and are disposed in substantially U-shaped relation with one end of each link connected to the bolt 26 and the opposite end connected to one of the movable blades.

The base 12 is provided with an elongated slot 27 through which the bolt 26 passes, and a lug 28 is interposed between the nut 29 of the bolt 26 and the upper surface of the loop 25, this lug having the lower end of a spring 30 connected thereto. The opposite or upper end of the spring 30 is connected, as at 31, to the handle 10, and this spring normally urges the bolt 26 upwardly so as to draw the links 21 upwardly and to swing the cutting edge portions of the movable blades 16 and 17 away from the keen edges 19 of the fixed blade 14.

The upper end of the operating rod or member 23 is provided with a loop or handle structure 32 so that this rod may be pushed downwardly within the handle 10, thereby tensioning the spring 30, and the spring 30 will automatically return the handle 32 upwardly and open the shears. Preferably, a spring 33 is disposed about the pivot 18 and acts to constantly maintain the blades 16 and 17 in sliding contact with the upper edge of the fixed blade 14.

A foot generally designated as 34 is secured to the lower face of the fixed blade 14, this foot portion 14 comprising a relatively long base 35 which is secured at the forward end to the forward end of the fixed blade 14, and the rear end of the base 35 is disposed in downwardly spaced relation to the rear portion of the blade 14 so as to dispose the fixed blade 14 on an angle and so that the fixed blade can be moved along the ground without the keen edge portion thereof contacting with the ground. The rear of the base 35 is provided with an L-shaped extension 36, one leg of which is secured to the fixed member 14 rearwardly of the pivot 33. It will be seen from the drawing that this sliding member 34 not only provides a means for maintaining the fixed and the movable blades out of contact with the ground, but also provides a protecting means for the adjustable pivot 18.

In the operation of this device, the blades may be disposed adjacent the ground with the base portion 34 in contact with the ground, and the device may be moved along the ground and during such movement, the handle or operating member 32 may be pushed inwardly of the tubular handle 10, so as to swing the movable blades 16 and 17 into engagement with the fixed blade 14.

While I have shown a shears constructed of two blades so as to provide a double acting shears, I do not wish to be limited to this particular construction as, if desired, this shears may be made with only one movable blade or with any desired number of interconnected blades.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A shears as set forth comprising a fixed blade having keen portions on the opposite edges thereof, a pair of movable blades, a slotted plate carried by the fixed blade, a handle secured to the plate, operating means for the movable blades, means engaging the slot in the plate and connecting the operating means with the movable blades whereby to swing said blades toward or from each other, and yieldable means engaging the operating means to constantly urge said movable blades into open position.

2. A shears as set forth comprising a body portion, a fixed blade secured to said body portion and extending forwardly therefrom, a movable blade, means for pivoting said movable blade for movement toward or from the fixed blade, a foot member secured to the fixed blade and projecting downwardly therefrom, a handle, means for securing the handle to the body, reciprocable operating means carried by the handle, said body having an elongated slot therein extending longitudinally of the body, a link secured at one end to the movable blade, means engaging the other end of the link and the operating means and extending through the slot to swing the movable blade laterally of the body upon movement of the operating means longitudinally of the body and the handle, and a spring secured at one end to said handle and at the other end to said latter named means.

In testimony whereof I hereunto affix my signature.

SVERRE R. SVENDSGAARD.